United States Patent [19]

Miyazaki et al.

[11] Patent Number: 5,419,504
[45] Date of Patent: May 30, 1995

[54] REVERSE ROTATION PREVENTIVE DEVICE FOR FISHING REEL

[75] Inventors: Takeo Miyazaki; Hideaki Takahashi, both of Tokyo, Japan

[73] Assignee: Daiwa Seiko, Inc., Tokyo, Japan

[21] Appl. No.: 54,025

[22] Filed: Apr. 29, 1993

[30] Foreign Application Priority Data

May 1, 1992 [JP] Japan ................... 4-137580
May 1, 1992 [JP] Japan ................... 4-137581

[51] Int. Cl.⁶ ................. A01K 89/027; A01K 89/033
[52] U.S. Cl. .................................. 242/247; 242/299
[58] Field of Search ............ 242/247, 248, 298, 299, 242/300, 156.2, 156; 188/82.1, 82.3, 82.8, 82.84

[56] References Cited

U.S. PATENT DOCUMENTS

| | | | |
|---|---|---|---|
| 138,881 | 5/1873 | Gladney | 188/82.8 |
| 138,897 | 5/1873 | Kimball | 188/82.8 |
| 3,756,565 | 9/1973 | Sakai | 188/82.8 |
| 4,538,825 | 9/1985 | Delahoussaye | 188/82.84 |
| 4,560,033 | 12/1985 | Delibody et al. | 188/82.8 |
| 4,669,686 | 6/1987 | Huber et al. | 242/156.2 |
| 4,856,959 | 8/1989 | Tabayashi | 188/82.1 |
| 5,020,738 | 6/1991 | Yamaguchi | 242/298 |
| 5,221,057 | 6/1993 | Yoshikawa | 242/299 |
| 5,285,985 | 2/1994 | Sakaguchi | 242/299 |

FOREIGN PATENT DOCUMENTS 64-38964 3/1989 Japan .
4-21264 2/1992 Japan .

*Primary Examiner*—Joseph J. Hail, III
*Attorney, Agent, or Firm*—Longacre & White

[57] ABSTRACT

A device for preventing a reverse rotation of a fishing reel is made up of restrictors provided in the body of the fishing reel so that the restrictors are disposed near the peripheral or lateral portion of a rotary member such as a handle shaft which is rotated in conjunction with the handle of the reel, and engagement members provided between the rotary member and the restrictors so that the engagement members can be engaged in between the rotary member and the restrictors by the reverse rotation of the rotary member in a fishline unwinding direction to produce wedge effects on the rotary shaft to prevent it from performing the reverse rotation further and can be disengaged out between the rotary member and restrictors by the forward rotation of the rotary member in a fishline winding direction to allow the rotary member to perform the forward rotation further. The angle of the reel is made small enough to facilitate the fishing action, particularly a hooking action.

11 Claims, 6 Drawing Sheets

REVERSE ROTATION PREVENTIVE DEVICE FOR FISHING REEL

BACKGROUND OF THE INVENTION

The present invention relates to an improved device for preventing the reverse rotation of a fishing reel.

A conventional device for preventing the reverse rotation of a fishing reel includes a rolling-element one-way clutch, the angle of rotative play of which at the time of the reverse rotation is made so small that the hooking action in fishing can be smoothly performed, as disclosed in the Japanese Utility Model Unexamined Publications No. Sho. 64-38964 and Hei. 4-21264.

Since the rolling-element one-way clutch is integrally assembled as a unit in the fishing reel, the design of the clutch is limited due to the place of disposition thereof on the rotary part of the reel, the diameter of the shaft of the part and so forth. Thus, the united one-way clutch cannot conform to the form and/or the size of the reel easily. Further, the cost of the clutch is made high.

SUMMARY OF THE INVENTION

The present invention was made in order to solve the above-mentioned problems. Accordingly, it is an object of the present invention to provide a reverse rotation preventive device which has a simple construction and can prevent the reverse rotation of a fishing reel with a smaller rotative play.

The present invention provides a reverse rotation preventive device for a fishing reel, comprising: a body frame; a rotary member rotatable in both first and second directions; a restrictor provided on the body frame in the vicinity of the rotary member; and an engagement member provided between the rotary member and the restrictor, the engagement member being engageable in between the rotary member and the restrictor in conjunction with a reverse rotation of the rotary member in the first direction to prevent the rotary member from rotating in the first direction further and disengageable out between the rotary member and the restrictor in conjunction with a forward rotation of the rotary shaft in the second direction to permit the rotary member to rotate in the second direction further.

When the rotary member is rotated in the first direction, i.e. in a fishline unwinding direction, the engagement member is engaged in between the rotary member and the restrictor by the rotation of the rotary shaft in the first direction to produce a wedge effect thereon to prevent the rotary member from rotating in the first direction further. When the rotary member is rotated in the second direction, i.e. a fishline winding direction, the engagement member of the device is disengaged out between the rotary member and the restrictor by the rotation of the rotary member in the second direction to allow the rotary member to rotate in the second direction further.

DETAILED DESCRIPTION OF THE PREFERRED EMBODIMENTS

Embodiments of the present invention are hereafter described with reference to the drawings attached hereto.

Figure 1:
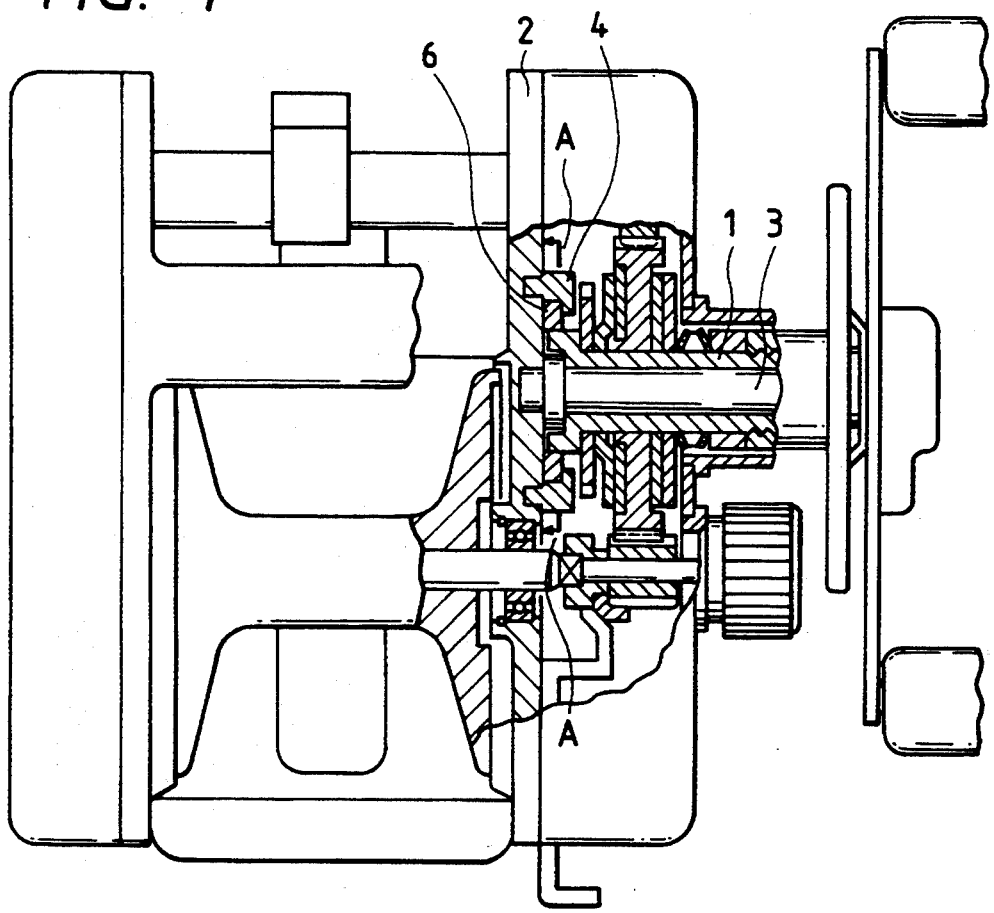
FIG. 1 is a cutaway plan view of a fishing reel provided with a device which is an embodiment of the present invention and is for preventing the reverse rotation of the reel.
Figure 2:
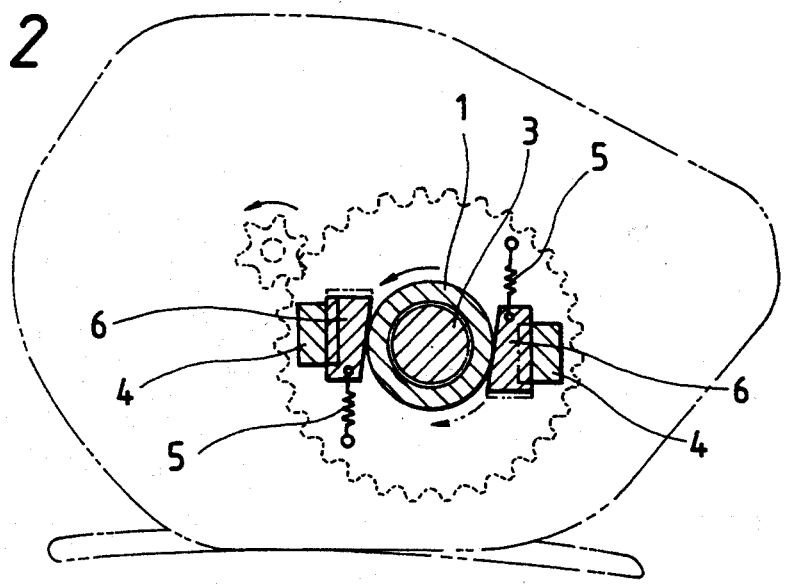
FIG. 2 is a sectional view of the reel along lines A—A shown in FIG. 1.

FIGS. 1 and 2 show a device which is one of the embodiments and is for preventing the reverse rotation of a fishing reel whose spool shaft is supported at both the ends thereof. The reel includes a handle shaft 1, a body frame 2, and a support bar 3. The device includes restrictors 4, urging springs 5, and wedge-shaped engagement members 6. The handle shaft 1 is a rotary member rotatably supported by the support bar 3 extending out of the body frame 2. The restrictors 4 are secured to the frame 2 at both the sides of the handle shaft 1. Each of the engagement members 6 is disposed between the handle shaft 1 and the respective restrictor 4 and pulled by the urging spring 5 so that the member can be engaged in between the shaft and the restrictor by the fishline unwinding rotation of the shaft to produce wedge effect thereof to prevent the rotation from being performed further.

When the handle shaft 1 is rotated forward in a fishline winding direction shown by a dotted-line arrow in FIG. 2, the shaft moves the engagement members 6 in such directions as not to engage then in between the shaft and restrictors 4 to produce the wedge effects on the shaft, thereby allowing it to be rotated forward further to wind a fishline on the reel. When the handle shaft 1 is rotated reversely in a fishline unwinding direction shown by a full-line arrow in FIG. 2, the shaft moves the engagement members 6 in such directions as to engage them in between the shaft and the restrictors 4 to produce the wedge effects on the shaft to prevent it from being reversely rotated further. The reverse rotation of the reel is thus prevented.

Figure 3:
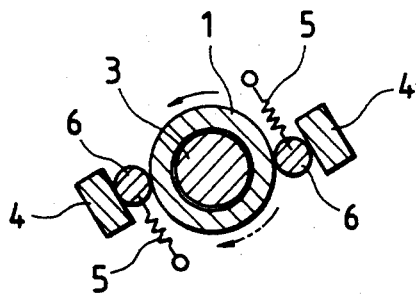
FIG. 3 is a sectional view of a device which is another embodiment of the invention and is for preventing the reverse rotation of a similar fishing reel.

FIG. 3 shows a device which is another of the embodiments and is for preventing the reverse rotation of a fishing reel whose spool shaft is supported at both the ends thereof. The difference of the device from the preceding one is that the gap between a handle shaft 1 and each restrictor 4 is shaped as a wedge or tapered, and the cross section of each engagement member 6 is shaped as a circle. The device performs the same operation as the preceding one to prevent the reverse rotation of the reel.

Figure 4:
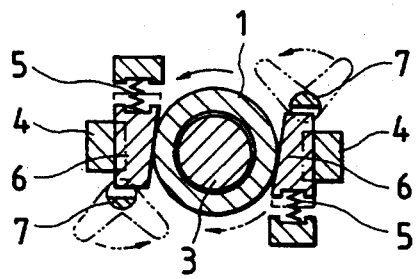
FIG. 4 is a sectional view of a device which is yet another embodiment of the invention and is for preventing the reverse rotation of a similar fishing reel.

FIG. 4 shows a device which is yet another of the embodiments and is for preventing the reverse rotation of a fishing reel whose spool shaft is supported at both the ends thereof. The difference of the device from that shown in FIGS. 1 and 2 is that stoppers 7 are provided for wedge-shaped engagement members 6, and can be shifted to control the engagement members to allow the handle shaft 1 of the reel to be rotated either forward or reversely. More specifically, if each stopper 7 is turned in a direction shown by a dotted arrow in FIG. 4, a cam surface of the stopper 7 moves the wedge-shaped engagement member 6 against a urging force of the urging spring 5 so that the engagement member 6 cannot perform the wedge effect when the handle shaft 1 is rotated reversely, i.e. in a direction shown by an two-dotted arrow in FIG. 4. Therefore, the handle shaft is allowed to be rotated both forwardly and reversely in this condition.

Figure 5:
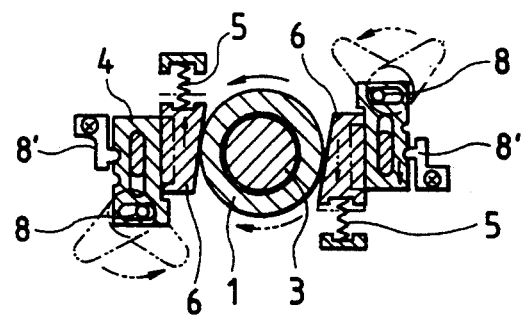
FIG. 5 is a sectional view of a device which is still another embodiment of the invention and is for preventing the reverse rotation of a similar fishing reel.

FIG. 5 is a device which is yet another of the embodiments and is for preventing the reverse rotation of a fishing reel whose spool shaft is supported at both the ends thereof. The difference of the device from that shown in FIGS. 1 and 2 is that stoppers 8 and position keepers 8' are provided for restrictors 4, and the stoppers can be shifted to control the restrictors to allow the handle shaft 1 of the reel to be rotated either forward or reversely. More specifically, in this embodiment, the restrictors 4 are movably supported on the frame or the like. Each of the restrictor 4 is moved by the stopper 8 to and kept by the position keeper 8' at a first position where the wedge-shaped engagement member can freely perform the wedge action between the restrictor 4 and the handle shaft 1 when the handle shaft is reversely rotated and a second position where the wedge-shaped engagement member is prevented from performing the wedge action.

Figure 6:
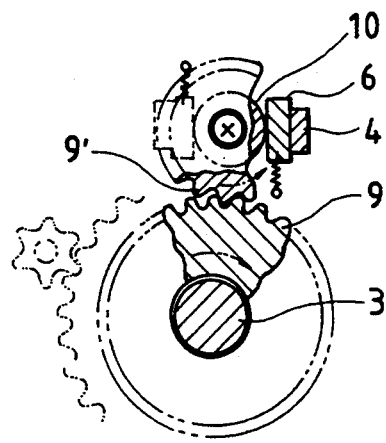
FIG. 6 is a sectional view of a device which is further embodiment of the invention and is for preventing the reverse rotation of a similar fishing reel.

FIG. 6 shows a device which is yet another of the embodiments and is for preventing the reverse rotation of a fishing reel whose spool shaft is supported at both the ends thereof. The difference of the device from that shown in FIGS. 1 and 2 is that a gear 9 is mounted on the handle shaft 1 of the reel so as to be rotated together with the shaft, another gear 9' is mounted on a speed increase shaft 10 and engaged with the former gear so as to be rotated together with the speed increase shaft, and restrictors 4 and engagement members 6 are disposed near the speed increase shaft. The device performs the same operation at the speed increase shaft 10 as the preceding device to prevent the reverse rotation of the reel.

Figure 7:
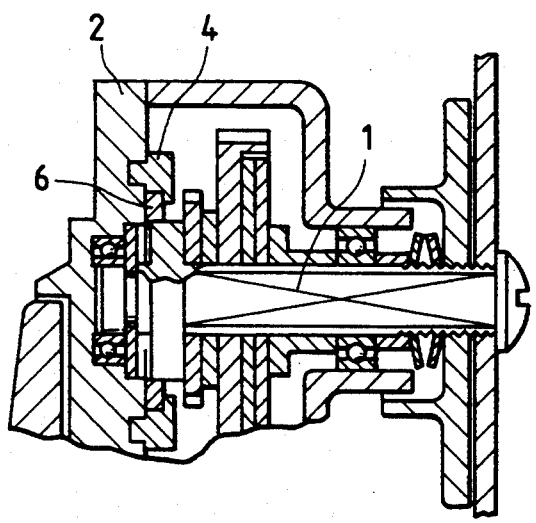
FIG. 7 is a sectional view of a different fishing reel provided with a similar device.

FIG. 7 shows a device which is the same in constitution and operation as that shown in FIGS. 1 and 2 and is for preventing the reverse rotation of a fishing reel which has a spool shaft supported at both the ends thereof and does not have a support bar for a handle shaft 1.

Figure 8:
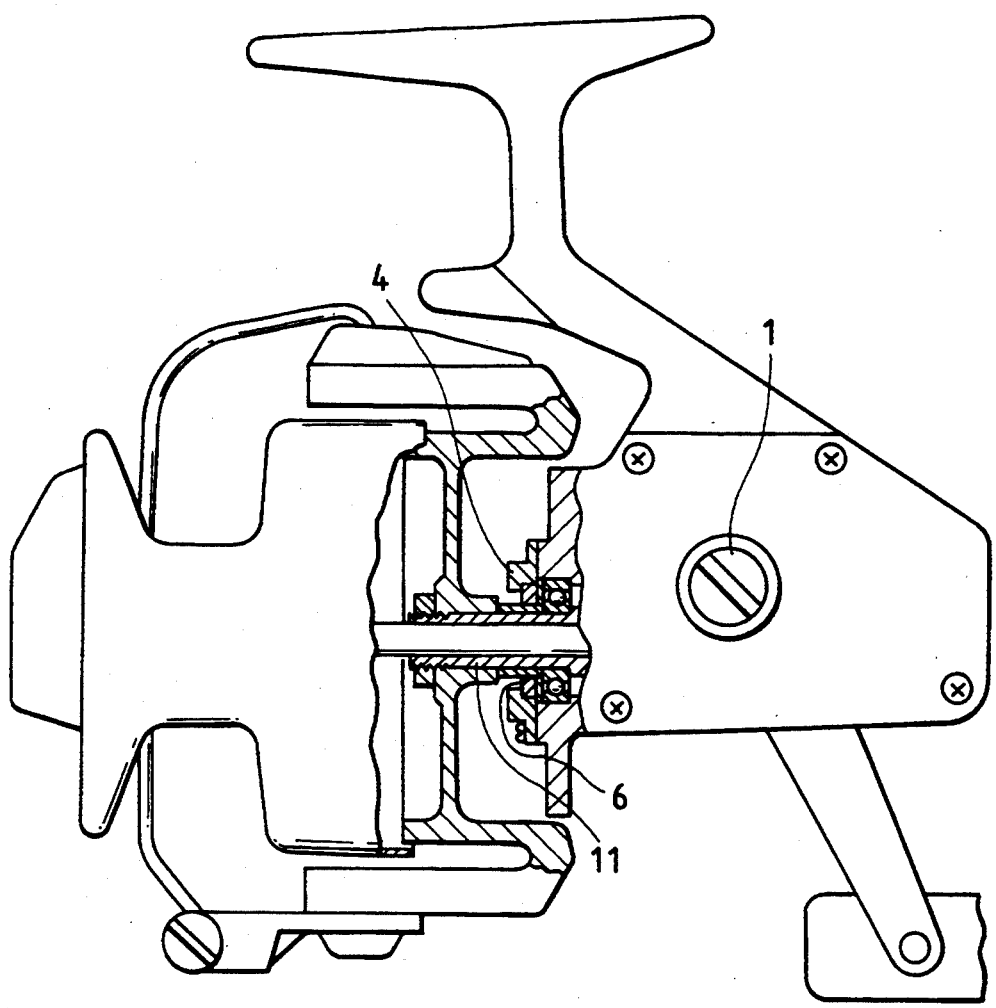
FIG. 8 is a cutaway side view of a spinning reel provided with a device which is yet another embodiment of the invention and is for preventing the reverse rotation of the reel.

FIG. 8 shows a device which is yet another of the embodiments and is for preventing the reverse rotation of a spinning reel for fishing. The difference of the device from that shown in FIGS. 1 and 2 is that restrictors 4 and engagement members 6 are provided near a rotor turning quill 11, which is rotated in conjunction with a handle shaft 1. The device performs the same operation at the quill 11 as the preceding device to prevent the reverse rotation of the reel.

Figure 9:
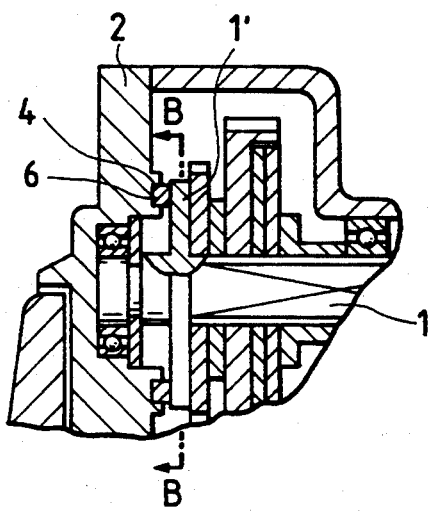
FIG. 9 is a sectional view of a device which is yet another embodiment and is for preventing the reverse rotation of a fishing reel.
Figure 10:
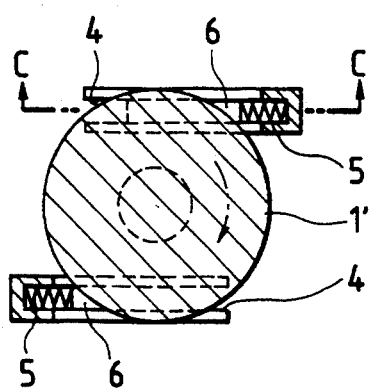
FIG. 10 is a sectional view of the device taken along line B—B in FIG. 9.
Figure 11:
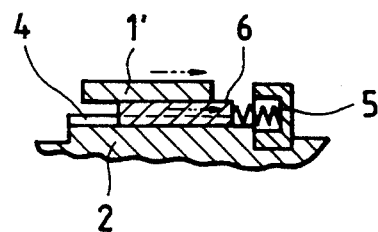
FIG. 11 is a sectional view of the device taken along line C—C in FIG. 10.

FIGS. 9, 10 and 11 show a device which is yet another of the embodiments and is for preventing the reverse rotation of a reel whose spool shaft is supported at both the ends thereof. In this device, the engagement member 6 performing the wedge action is provided between the body frame 2 and the side portion of the rotary member 1'. The groove-like restrictors 4 are provided on the frame 2 confronting a side portion of a disk part 1' of the handle shaft 1. The engagement members 6 are slidably supported in the groove-like restrictors 4 so as to perform the wedge action between the body frame 2 and the side portion of the rotary member 1' in conjunction with the reverse rotation of the handle shaft 1 and to allow the forward rotation of the handle shaft 1.

Figure 12:
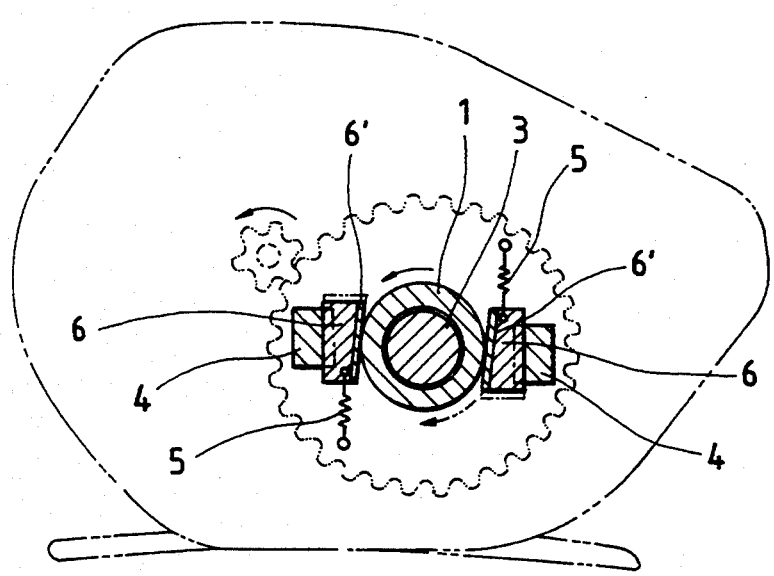
FIG. 12 is a cutaway plan view of a fishing reel provided with a device which is yet another embodiment of the present invention and is for preventing the reverse rotation of the reel.

FIG. 12 shows a device which is yet another of the embodiments and is for preventing the reverse rotation of a fishing reel whose spool shaft is supported at both the ends thereof. The difference of the device from that shown in FIGS. 1 and 2 is that each wedge-shaped engagement member 6 has a low-friction part confronting and contacting the handle shaft 1. The low friction part 6' is formed such that a separate member made of a low-friction material is securely attached to one side of the wedge-shaped engagement member 6' confronting the handle shaft 1, or one side of the wedge-shaped engagement member confronting the handle shaft 1 is subjected to the surface finishing (the mirror grinding is suitable). The low friction part 6' may be formed such that groove rows are provided in the one side of the wedge-shaped engagement member 6 to reduce contacting area between the handle shaft 1 and the wedge-shaped engagement member 6. The low friction part 6' can reduce a friction resistance between the handle shaft 1 and the engagement member 6 when the handle shaft 1 is rotated forward, to thereby enhance the fishline winding operation.

Since a device provided in accordance with the present invention in order to prevent the reverse rotation of a fishing reel is small in the angle of rotative play which the device performs at the time of the reverse rotation, a fishing person can easily and quickly perform a fishing action, particularly a hooking action. Since the design of the device is not limited by the form of the reel, the diameter of the shaft of the rotary part thereof, the place of disposition of the device in the reel and so forth so much as the design of a conventional device made of a rolling-element one-way clutch, the former device can be simply and compactly disposed. The constitution of the former device is simplified so that the cost thereof is much lowered.

Figure 13:
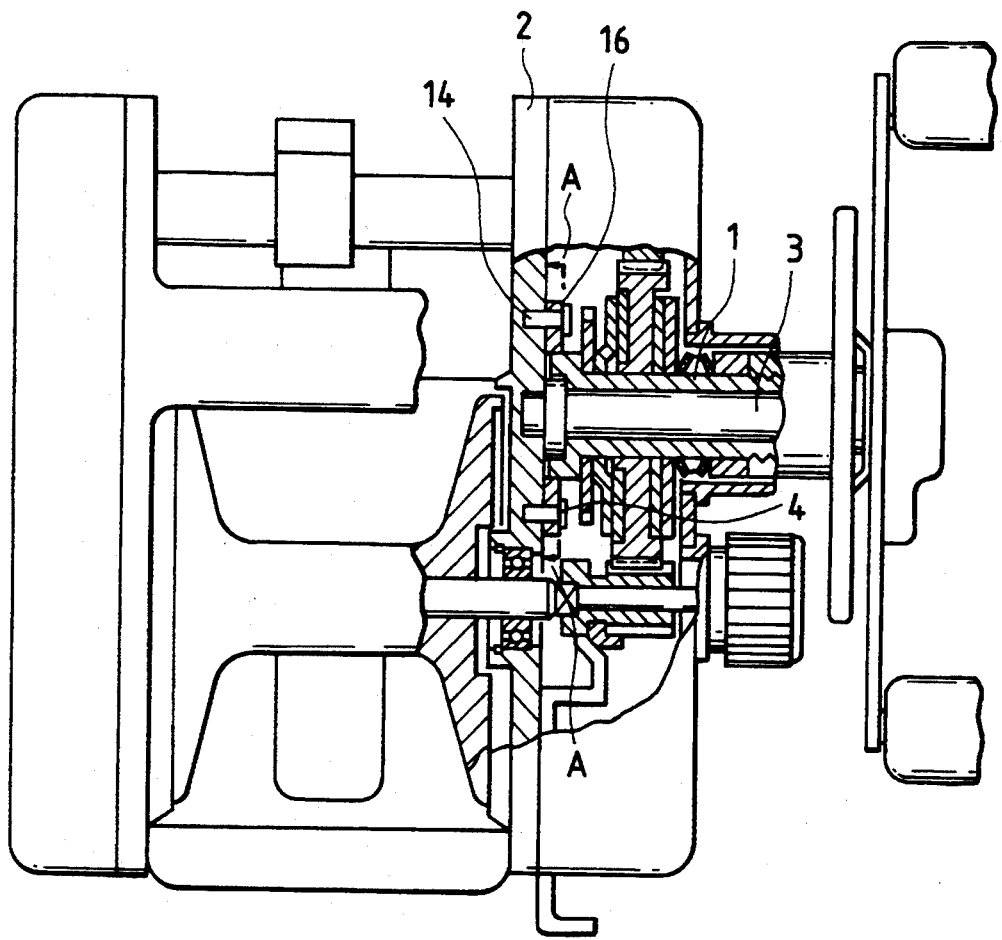
FIG. 13 is a partially cutaway view of a fishing reel provided with a device which is yet another embodiment of the present invention and is for preventing the reverse rotation of the reel.
Figure 14:
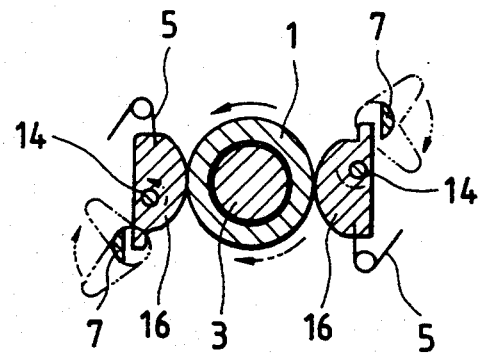
FIG. 14 is a sectional view taken along line A—A in FIG. 13.

FIGS. 13 and 14 show a device which is another of the embodiments and is for preventing the reverse rotation of a fishing reel whose spool shaft is supported at both the ends thereof. The reel includes a handle shaft 1, a body frame 2, and a support bar 3. The handle shaft 1 is rotatably supported by the bar 3 extending out of the frame 2. The device includes restrictors in the form of support pins 14, urging springs 5, engagement members 16, and stoppers 7. The support pins 14 are secured to the frame 2 at both the sides of the handle shaft 1. The engagement members 16 are supported in a swingable manner by the pins 14. The pins 14 are positioned so that the cam surfaces of the engagement members 16 are permitted to be moved away from the outer periphery of the handle shaft 1 when the handle shaft is rotated in a fishline winding direction and brought into pressure-contact with the outer periphery of the handle shaft 1 when the handle shaft 1 is rotated in a fishline unwinding direction. The urging springs 5 function to urge respective engagement members 6 so that cam surfaces of engagement members 16 are brought into contact with the handle shaft 1. The stoppers 7 are supported by the frame 2 at the ends of the engagement members to control a swing motion of the engagement members 16. Each stopper 7 can pivotably move the respective engagement member 16 to move the cam surface thereof away from the outer periphery of the handle shaft 1 and can keep the engagement member 16 at that position in order to permit the handle shaft 1 to be rotated in both the forward and reverse directions.

When the handle shaft 1 of the reel is rotated forward in a fishline winding direction shown by a dotted-line arrow in FIG. 14, the engagement members 16 of the device are swung by the rotation of the shaft so that the cam surfaces of the engagement members are moved away from the peripheral surface of the shaft to allow the handle shaft to be rotated forward further to wind a fishline on the reel. When the handle shaft 1 is rotated reversely in a fishline unwinding direction shown by a full-line arrow in FIG. 14, the engagement members 16 are swung by the rotation of the shaft so that the cam surface of the engagement members are engaged on the peripheral surfaces of the shaft under pressure to prevent the shaft from being rotated reversely further. The stoppers 7 can be shifted to keep the engagement members 16 away from the peripheral surface of the handle shaft 1 so that the handle shaft can be rotated either forward or reversely.

In addition, this device may be also applied to a different type of fishing reel.

Figure 15:
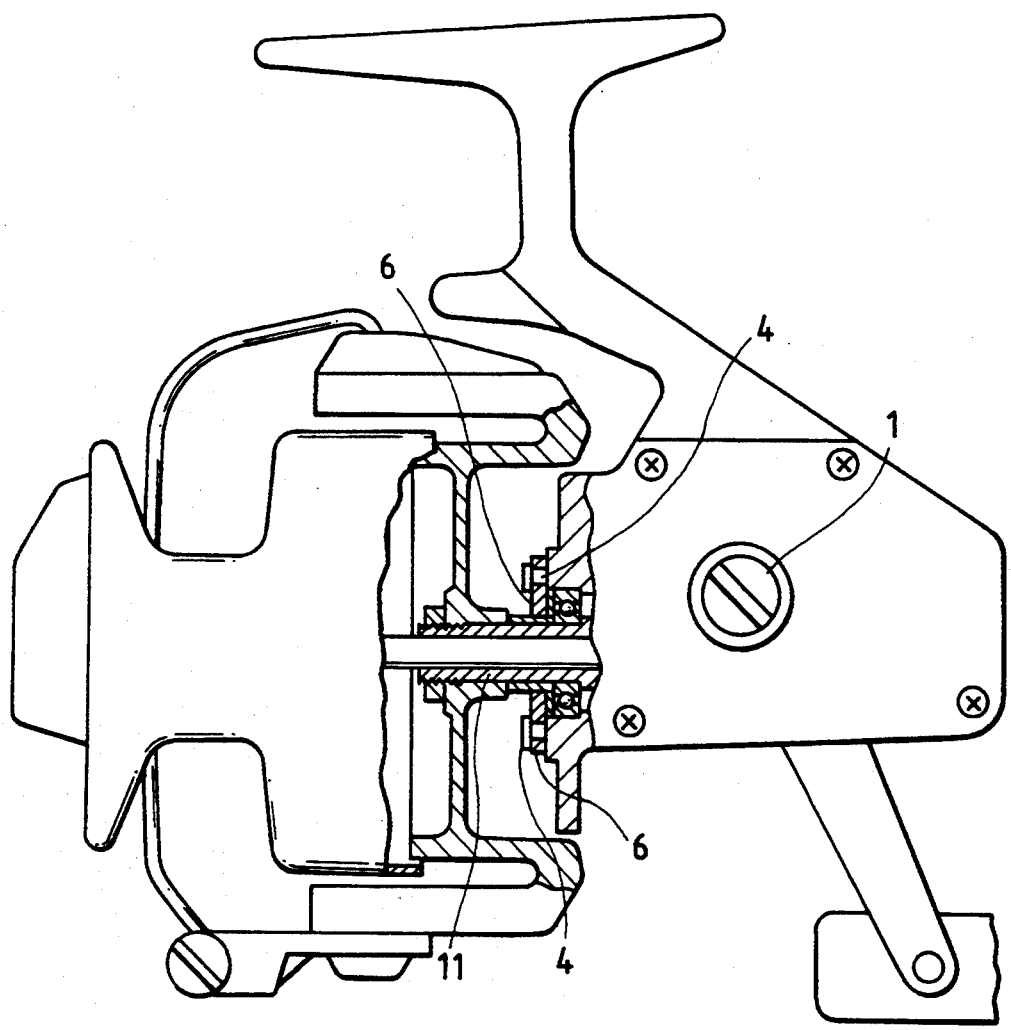
FIG. 15 is a cutaway side view of a spinning reel provided with a device which is yet another embodiment of the invention and is for preventing the reverse rotation of the reel.

FIG. 15 shows a device which is another of the embodiments and is for preventing the reverse rotation of a spinning reel for fishing. The reel includes a handle shaft 1, and a rotor turning quill, which is rotated in conjunction with the handle shaft. The device is similar in constitution and operation to the above-mentioned device described in association with FIGS. 13 and 14, and is provided at the rotor turning quill 11.

Since a device provided in accordance with the present invention in order to prevent the reverse rotation of a fishing reel is small in the angle of rotative play which the device performs at the time of the reverse rotation, a fishing person can easily and quickly perform a fishing action, particularly a hooking action. Since the design of the device is not limited by the form of the reel, the diameter of the shaft of the rotary part thereof, the place of the disposition of the device in the reel and so forth so much as the design of a conventional device made of rolling-element one-way clutch, the former device can be simply and compactly disposed. Since the engagement members of the former device have cam surfaces and are supported to be swung to prevent the reverse rotation of the reel, the constitution of the device is simplified so that the cost thereof is much lowered.

What is claimed is:

1. A reverse rotation preventive device for a fishing reel, comprising:
   a body frame;
   a rotary member rotatable in both first and second directions;
   a restrictor means provided on said body frame in the vicinity of said rotary member for restricting rotation of said rotary member; and
   engagement means adapted for rectilinear movement between said rotary member and said restrictor means, said engagement means being engageable in between said rotary member and said restrictor means in conjunction with a reverse rotation of said rotary member in said first direction to prevent said rotary member from rotating in said first direction further and disengageable out between said rotary member and said restrictor means in conjunction with a forward rotation of said rotary member in said second direction to permit said rotary member to rotate in said second direction further.

2. The device according to claim 1, wherein a gap between said rotary member and said restrictor means is formed into a substantially wedge shape so that said engagement means produces a wedge effect between said rotary member and said restrictor means when said rotary member is rotated in said first direction.

3. The device according to claim 1, wherein said engagement means is formed into a substantially wedge shape so that said engagement means produces a wedge effect between said rotary member and said restrictor means when said rotary member is rotated in said first direction.

4. The device according to claim 1, wherein said engagement means is slidably supported on said body frame through said restrictor means.

5. The device according to claim 1, further comprising:
   means for urging said engagement means so that said engagement means is brought into contact with said rotary member.

6. The device according to claim 1, further comprising:
   means for displacing said engagement means so as not to engage in between said rotary member and said restrictor means, thereby permitting said rotary member to rotate in both said first and second directions.

7. The device according to claim 1, further comprising:
   means for displacing said restrictor means so that said engagement means is prevented from being engaged in between said rotary member and said restrictor means, thereby permitting said rotary member to rotate in both said first and second directions.

8. The device according to claim 1, wherein said engagement means includes a low-friction part contacting said rotary member.

9. The device according to claim 1, wherein said engagement means and said restrictor means are each provided at diametrically opposed position with respect to said rotary member.

10. The device according to claim 1, wherein said rectilinear movement is parallel to a tangent to said first and second directions.

11. The device according to claim 1, wherein said restrictor means contacts said engagement means along a rectilinear surface.

* * * * *